United States Patent [19]

Michel et al.

[11] 3,932,219

[45] Jan. 13, 1976

[54] ANTIBIOTIC A-26771 FACTORS AND PROCESS FOR PRODUCTION THEREOF

[75] Inventors: Karl H. Michel; Marvin M. Hoehn, both of Indianapolis, Ind.

[73] Assignee: Eli Lilly and Company, Indianapolis, Ind.

[22] Filed: Jan. 17, 1975

[21] Appl. No.: 541,908

Related U.S. Application Data

[62] Division of Ser. No. 298,053, Oct. 16, 1972, Pat. No. 3,883,561.

[52] U.S. Cl. ................................ 195/81; 195/35
[51] Int. Cl.$^2$ ......................................... C12D 9/04
[58] Field of Search .............. 195/81, 32, 35, 36 P; 260/343 R, 239.3 B

[56] References Cited
UNITED STATES PATENTS
3,673,172   6/1972   Svokos ..................... 260/239.3 B OTHER PUBLICATIONS
Johns et al., Chemical Communications, J. Chem. Soc. (b), pp. 163–164, (1971).
Poisel et al., Agew Chem., Int. Ed., Vol. 10, pp. 130–131, (1971).
The American Type Culture Collection Catalogue of Strains, 8th Ed., (1968), p. 105.

Primary Examiner—A. Louis Monacell
Assistant Examiner—Thomas G. Wiseman
Attorney, Agent, or Firm—Nancy J. Harrison; Everet F. Smith

[57] ABSTRACT

Antibiotic mixture A-26771, comprising microbiologically active factors A, B and C, produced by fermentation of *Penicillium turbatum* Westling NRRL 5630, and isolation and separation of the individual factors thereof by extraction, chromatography and crystallization. The A-26771 mixture and factors A, B and C thereof have antifungal and broad-spectrum antibacterial activity; factors A and C also have antiviral activity.

4 Claims, 3 Drawing Figures

FIG. I

ANTIBIOTIC A-26771 FACTORS AND PROCESS FOR PRODUCTION THEREOF

This is a division of application Ser. No. 298,053, filed Oct. 16, 1972, now U.S. Pat. No. 3,883,561.

SUMMARY OF THE INVENTION

This invention relates to antibiotic substances. In particular, it relates to a group of heterocyclic antibiotic substances which are produced by culturing a hitherto undescribed strain of the organism *Penicillium turbatum* NRRL 5360.

The antibiotics of this invention are arbitrarily designated herein as A-26771 antibiotics. Three individual antibiotics have been isolated, separated and characterized from the antibiotic A-26771-producing culture. These individual antibiotics are designated as A-26771 factors A, B and C.

The A-26771 group of antibiotics is produced by culturing a novel strain of *Penicillium turbatum* under submerged aerobic fermentation conditions until a substantial level of antibiotic activity is produced. The A-26771 antibiotics are recovered by extraction of both the broth and the mycelia with polar organic solvents. Extraction of the broth and evaporation of the organic solvent give a mixture of A-26771 antibiotics which contains mainly factor A and a small quantity of factor C. Extraction of the mycelia with organic solvent and evaporation of this solvent give an additional amount of A-26771 antibiotics in which factor B is the main component.

The individual A-26771 antibiotics have been separated from each other and isolated as individual antibiotic compounds by column chromatography, thin-layer chromatography and crystallization procedures.

The A-26771 antibiotics inhibit the growth of organisms which are pathogenic to animal and plant life, including gram-positive and gram-negative bacteria and various fungi. In addition, factors A and C have antiviral activity.

DESCRIPTION OF THE DRAWINGS

The infrared absorption spectrum for each of the A-26771 antiobiotic factors is presented in the drawings as follows.

DETAILED DESCRIPTION OF THE INVENTION

The A-26771 antibiotic factors A, B and C are produced by cultivating under controlled conditions a hitherto undescribed strain of *Penicillium turbatum* NRRL 5630.

As is the case with many antibiotic-producing cultures, fermentation of an antibiotic A-26771-producing strain of *Penicillium turbatum* results in the production of a number of antibiotic substances. Antibiotic A-26771 factors A, B, and C are three of these substances. Other substances are present in only very minor quantities or are relatively unstable.

The antibiotic factors co-produced during the fermentation are obtained as a mixture and are separated from each other and isolated as individual compounds as hereinafter described.

The following paragraphs describe the physical and spectral properties of the various A-26771 factors which have been characterized.

Antibiotic A-26771 factor A is a crystalline compound (yellow plates from acetone) which has a melting point of about 105°C. The molecular weight of factor A, as determined by mass spectrometry, is 324. Elemental analysis of factor A gave the following percentage composition: carbon, 52.1%; hydrogen, 5.05%; nitrogen, 8.1%; oxygen, 15.1%; sulfur, 19.4%. The calculated empirical formula is $C_{14}H_{16}N_2O_3S_2$. The observed specific rotation of factor A, $[\alpha]_D^{25}$, is $-88°$ ($c = 0.15$, methanol).

Figure 1:
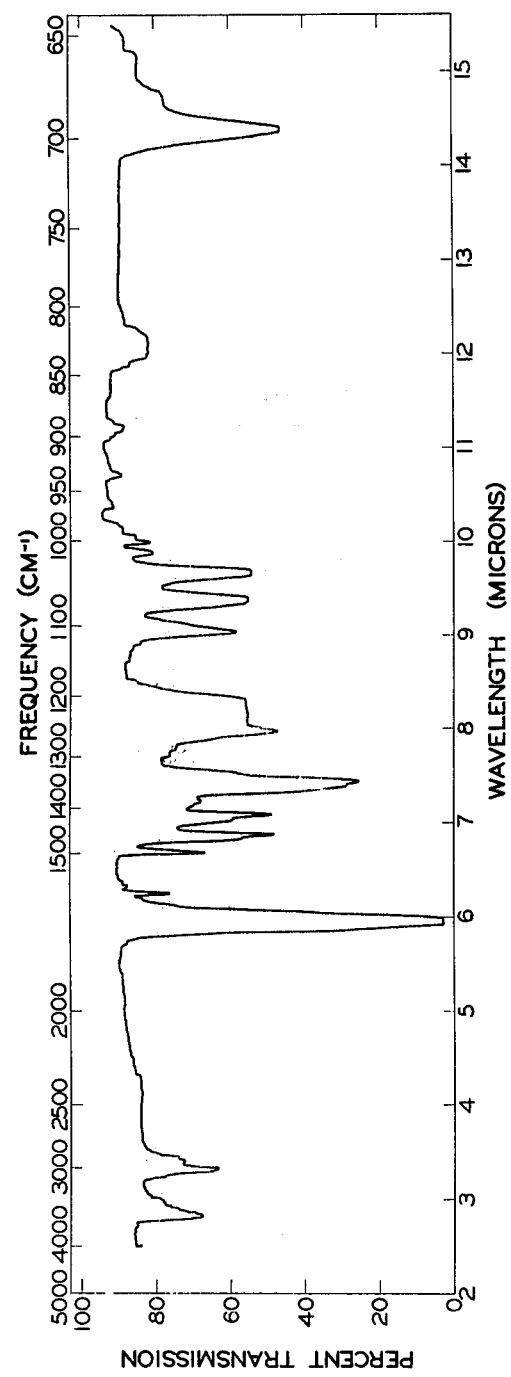
FIG. 1 — Factor A.

The infrared absorption spectrum of antibiotic A-26771 factor A in chloroform is shown in FIG. 1 of the accompanying drawing. The distinguishable bands in the infrared spectrum are as follow: 2.83, 3.34, 5.95 (very strong), 6.68, 6.88, 7.09, 7.44, 7.96, 9.04, 9.38, 9.65, and 4.40 microns.

The ultraviolet spectrum of factor A showed only end absorption. Electrometric titration of factor A in 66 percent dimethylformamide did not indicate the presence of titratable groups.

The nuclear magnetic resonance (NMR) spectrum of A-26771 factor A in chloroform showed the following characteristics: $\delta$ 7.34 (5H, singlet); 4.12, 3.62 (2H, AB, quartet, J = 16 Hz); 3.5–3.7 (1H multiplet, exchangeable); 4.3–4.5 (2H, multiplet), 3.21 (3H, singlet); and 2.98 ppm (3H, singlet).

Factor A is soluble in common polar organic solvents such as ethyl acetate, ethanol, methanol, chloroform and the like, but is relatively insoluble in water.

Based on the various foregoing physical characteristics, the structure of antibiotic A-26771 factor A has been determined to be as shown in Formula I:

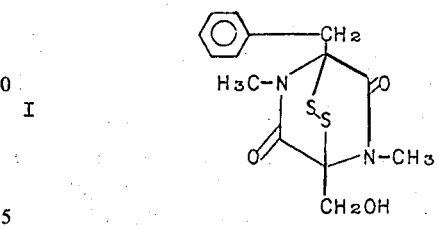

which structure is designated 3-benzyl-6-(hydroxymethyl)-1,4-dimethyl-3,6-epidithio-2,5-piperazinedione.

Antibiotic A-26771 factor B is a white crsytalline compound (long needles from acetone-water), melting at about 125°C. As determined by mass spectrometry, the molecular weight of factor B is 382. Elemental analysis of factor B gave the following percentage composition: carbon, 62.9%; hydrogen, 7.7%; oxygen, 29.0%. The calculated empirical formula is $C_{20}H_{30}O_7$. The observed specific rotation of factor B, $[\alpha]_D^{24}$, is $-14°$ ($c = 0.13$, methanol).

Figure 2:
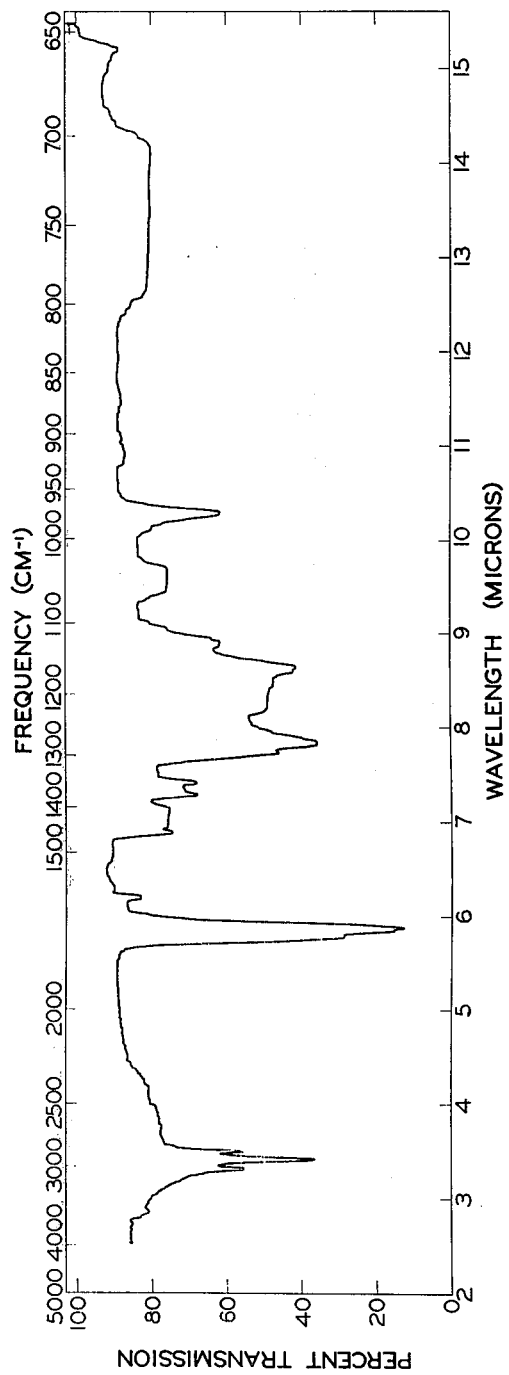
FIG. 2 — Factor B.

The infrared absorption spectrum of antibiotic A-26771 factor B in chloroform is shown in FIG. 2 of the accompanying drawings. The distinguishable bands in the infrared spectrum are as follows: 3.30, 3.40, 3.50, 5.86 (very strong), 6.20, 6.87, 7.26, 7.40, 7.70, 7.82, 8.65, 8.90 and 10.26 microns.

Factor B absorbs in the ultraviolet region of the spectrum and exhibits absorption maxima in both neutral and acidic ethanol solutions at $\lambda$ max. 222 m$\mu$ ($\epsilon$ 16,000) which shifts to $\lambda$ max. 365 m$\mu$ ($\epsilon$ 6,000) in base. The shift is irreversible.

The NMR spectrum of A-26771 factor B in chloroform showed the following characteristics: δ 9.30 (1H, singlet); 7.25, 6.75 (2H, quartet, AB, J = 16 Hz); 5.0–5.5 (2H, multiplet); 2.73 (4H, singlet); and 1.0–2.0 ppm (21H, multiplet).

Factor B is slightly soluble in polar organic solvents such as ethyl acetate, chloroform, acetone, ethanol, methanol, and the like, but is relatively insoluble in solvents such as water and diethyl ether.

Antibiotic A-26771 factor B is an ionophorous agent and, as such, inhibits glutamate oxidation in rat-liver mitochondria. The antibiotic may produce this effect by interfering with the transport of calcium or divalent cations.

Based on the various observed physical characteristics, a proposed structure of antibiotic A-26771 factor B has been devised. The structure has not been determined with certitude, however, and it is to be understood that the structure presented herein represents merely a working hypothesis. The structure postulated for factor B is as shown in Formula II:

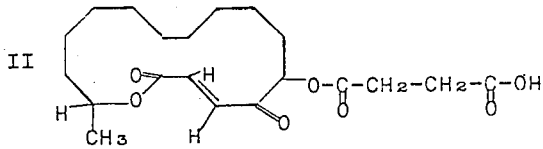

II which structure is designated mono(16-methyl-2,5-dioxooxacyclohexadec-3-en-6-yl) succinate.

Antibiotic A-26771 factor B is capable of forming ester derivatives by standard procedures, for example, by treatment with alcohol in the presence of an acid catalyst. These ester derivatives are also useful as antibiotics.

Antibiotic A-26771 factor C is a crystalline compound (colorless prisms from acetone-ether-pentane) melting at about 130°C. The molecular weight of factor C is 388, as determined by mass spectrometry. Elemental analysis of factor C gave the following percentage composition: carbon, 43.12%; hydrogen, 4.21%; nitrogen, 7.02%; sulfur, 32.5%. The calculated empirical formula is $C_{14}H_{16}N_2O_3S_4$. The observed specific rotation of factor C, $[\alpha]_D^{25}$, is 32/187 ($c$ = 0.04, methanol).

Figure 3:
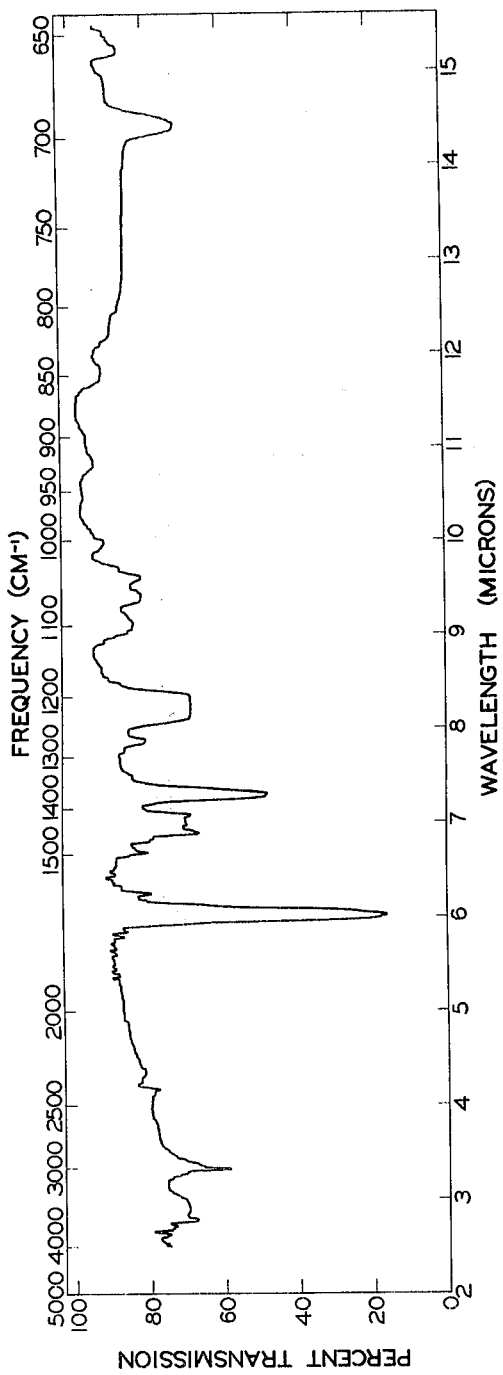
FIG. 3 — Factor C.

The infrared spectrum of antibiotic A-26771 factor C in chloroform is shown in FIG. 3 of the accompanying drawings. The distinguishable bands in the infrared spectrum are as follows: 2.79, 3.32, 6.00, 6.68, 6.89, 7.09, 7.30, 7.88, 9.10, 9.40, 9.60 and 14.45 microns.

The ultraviolet absorption spectrum of factor C in acidic ethanol shows an absorption maximum at λ max. 275 mμ(ε 10,000). In neutral solution, the UV spectrum of factor C shows only end absorption with a plateau in the 275–300 mμ range (molar absorption about 1200); in basic solution this plateau shifts to a shoulder at 260 mμ (molar absorption approximately 7,000) and a plateau at about 290–300 mμ (molar absorption about 4,000).

The NMR spectrum of A-26771 factor C in chloroform-$D_2O$ showed the following characteristics: δ 7.26 (5H, multiplet); 4.26, 3.85 (2H, AB, quartet, J = 13 Hz); 4.05, 3.25 (2H, AB, quartet, J = 15 Hz); 3.13 (3H, singlet); and 3.07 ppm (3H, singlet).

Factor C is soluble in common polar organic solvents such as ethyl acetate, ethanol, methanol, chloroform, and the like, but is relatively insoluble in water.

Based on the physical characteristics hereinabove recited, a proposed structure for antibiotic A-26771 factor C can be set forth. Since the structure determination is merely postulated, however, it is to be understood that the structure presented herein represents merely a working hypothesis. The tentative structure for factor C is shown in Formula III:

III

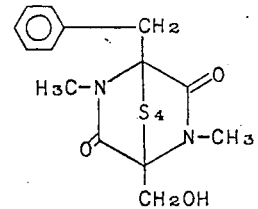

which structure is designated 3-benzyl-6-(hydroxymethyl)-1,4-dimethyl-3,6-epitetrathio-2,5-piperazinedione.

The mixture of A-26771 antibiotics and the individual factors thereof inhibit the growth of microorganisms which are pathogenic to animal and plant life, including gram-positive and gram-negative bacteria and various fungi. In addition, factors A and C are antiviral agents.

In Table I which follows, the inhibition-zone diameters in millimeters of the A-26771 antibiotic factors, as determined by the standard disc-plate assay, are listed for several illustrative microorganisms.

TABLE I

| Disc-Plate Activity of Factors A, B, and C | | | | | | |
|---|---|---|---|---|---|---|
| | Factor A | | Factor B | | Factor C | |
| mg./ml. | 1.0 | 0.1 | 1.0 | 0.1 | 1.0 | 0.1 |
| Organism | | | | | | |
| Staphylococcus aureus | 23 | 12 | 24 | 15 | 20 | — |
| Mycobacterium avium | 14 | tr* | 9 | — | 11 | — |
| Bacillus subtilis | 22 | 11 | 14 | tr | 20 | tr |
| Sarcina lutea | 28 | 18 | 22 | 12 | 26 | 14 |
| Escherichia coli | 12 | — | — | — | tr | — |
| Klebsiella pneumoniae | 12 | — | — | — | tr | — |
| Serratia marcescens | 14 | — | — | — | 14 | — |
| Pseudomonas solanacearum | 13 | — | — | — | — | — |
| Saccharomyces pastorianum | 32 | 19 | 25 | 12 | 25 | — |
| Neurospora crassa | 27 | 13 | 13 | — | 22 | — |
| Candida albicans | 28 | tr | tr | — | 23 | — |
| Fusarium moniliforme | 14 | 10 | tr | — | 8 | — |
| Trichophyton mentagrophytes | 27 | 19 | 14 | tr | 19 | 12 |

*trace

The in vitro susceptibilities of selected bacteria to antibiotic A-26771 factor B have been determined by standard broth-dilution and agar-dilution assays. The minimal inhibitory concentrations (MIC), as determined by these methods, are summarized in Table II.

TABLE II

In vitro Activity of A-26771 Factor B

| Organism | MIC (µg./ml.) |
|---|---|
| Organism | |
| Staphylococcus aureus[a] | <1.56 |
| Streptococcus faecalis[a] | 25.0 |
| Vibrio coli[b] | 50.0 |
| Mycoplasma gallisepticum[b] | 3.12 |
| Mycoplasma granularum[b] | 50.0 |
| Mycoplasma synoviae[b] | 12.5 |
| Mycoplasma hyosynoviae[b] | 12.5 |
| Mycoplasma hyopneumoniae[b] | 12.5 |
| Erwinia amylovora[a] | <0.78 |
| Pasteurella multocida[b] | 6.25 |
| Xanthomonas phaseoli[a] | 50.0 |
| Candida tropicalis[a] | 100.0 |
| Trichophyton mentagrophytes | 6.25 |
| Botrytis cinerea | 12.5 |
| Ceratocystis ulmi | 6.25 |
| Verticillium albo-atrum | 50.0 |

[a] agar dilution
[b] broth dilution

The activity of antibiotic A-26771 factors A and C against viral growth in tissue culture has been demonstrated against several viruses, including polioviruses and Coxsackie virus. In addition, the antiviral activity of factor A has been demonstrated in vivo from the biological activity of serum levels in mice.

The ability of antibiotic factors A and C to control the growth of virus in vitro is readily demonstrated by using a plaque suppression test similar to that described by Siminoff, *Applied Microbiology*, 9 [1], 66–72 (1961). The test is carried out as follows:

Rectangular glass boxes measuring 7½ × 15 × 1½ inches, made of pieces of double-strength plate glass sealed together with silicone rubber cement, are used in carrying out the test. The glass boxes are covered with a glass lid and, before use, are sterilized by dry heat at a temperature of about 300°C. Approximately 10⁶/ml. BS-C-1 serial culture of Cercopithecus monkey kidney, Hopps et al.) cell suspension is made in a medium composed of tissue culture medium 199, 5 percent of calf serum, penicillin (150 units/ml.) and streptomycin (150 µg./ml.). A portion of this suspension (250 ml.) is added to each sterilized glass box, and the box is incubated at about 37°C. for about 96 hours in a level position. After incubation, the medium is carefully drawn off, leaving a monolayer of cells undisturbed on the glass. The cells are then infected by gently adding to each box about 100 ml. of a suspension of virus in medium 199.

After a time of approximately 1 to 3 hours is allowed for adsorption of the virus on the cells, the infecting medium is removed from the plate. A mixture of 75 ml. of double-strength medium 199 with calf serum, penicillin, and streptomycin and 75 ml. of double-strength agar solution (Difco, purified, 2 percent) at 50°C. is poured over the virus-infected cell monolayer in each box and allowed to solidify at a level attitude. Filter-paper disks are dipped in solutions of the test substances, dried in a vacuum oven at no higher than 37°C. for about 1 hour, and then placed on the surface of the agar in the boxes. The boxes are incubated at about 37°C. for about 84 hour and are then flooded with aqueous 10 percent formalin-2 percent sodium acetate solution, and the agar is floated off with water. The cells remaining are stained with Wright's stain. Toxicity, antiviral activity, and the microscopic appearance of the cells are recorded following the procedure of Herrmann et al., *Proc. Soc. Exp. Biol, Med.*, 103, 625 (1960).

Plaques are seen in those areas of the plate where the virus has infected and reproduced in the cells. Zones of toxicity are also observed, and the diameters thereof are measured in millimeters whenever the test compound kills the cells under and around the filter-paper disk. Antiviral activity of the test compounds is detected by observing the absence of plaques and the presence of a heavier growth of cells in a zone under and around the filter-paper disks.

The cells in a zone of activity are examined with a microscope to determine the presence and degree of drug and/or virus damage. The staining is graded 1+, 2+, 3+, 4+, and negative to reflect the following:

4+ dark stained areas which, upon microscopic examination, show healthy cells with no visible virus or drug damage;

3+ less darkly stained areas that show no virus or drug damage but appear less healthy;

2+ areas showing healthy cells with a moderate amount of virus breakthrough;

1+ areas showing healthy cells with a greater virus breakthrough;

− no viable cells.

Table III which follows sets forth the results of tissue-culture test of antibiotic A-26771 factors A and C against Type III poliovirus and Coxsackie virus A-21 (COE strain). In the table, column 3 gives the diameter in millimeters of the zone of virus inhibition by the test compound, anad column 4 indicates the grading of the stained areas.

TABLE III

In Vitro Antiviral Activity of Factors A and C

| | Conc. µg./ml. | Zone mm. | Microscopic Examination | Virus |
|---|---|---|---|---|
| Factor A | 1000 | 50 | 4 + | polio |
| | 500 | 50 | 4 + | polio |
| | 250 | 46 | 4 + | polio |
| | 125 | 44 | 4 + | polio |
| | 62.2 | 40 | 4 + | polio |
| | 31.1 | 38 | 4 + | polio |
| | 15 | 34 | 4 + | polio |
| | 7.5 | 30 | 4 + | polio |
| | 3.2 | 24 | 4 + | polio |
| | 1.5 | 16 | 4 + | polio |
| Factor C | 1000.0 | 50 | 4 + | polio |
| | 100.0 | 40 | 4 + | polio |
| Factor A | 1000.0 | 52 | 4 + | COE |
| | 500.0 | 50 | 4 + | COE |
| | 250.0 | 45 | 4 + | COE |
| | 125.0 | 40 | 4 + | COE |
| | 62.2 | 38 | 4 + | COE |
| | 31.1 | 35 | 4 + | COE |
| | 15.0 | 32 | 4 + | COE |

TABLE III-continued

In Vitro Antiviral Activity of Factors A and C

| | Conc. µg./ml. | Zone mm. | Microscopic Examination | Virus |
|---|---|---|---|---|
| | 7.5 | 26 | 4+ | COE |
| | 3.2 | 20 | 4+ | COE |
| | 1.5 | 15 | 4+ | COE |
| Factor C | 1000.0 | 50 | 4+ | COE |
| | 100.0 | 40 | 4+ | COE |

The ability of antibiotic A-26771 factor A to control the growth of virus is further demonstrated by antiviral testing in mice, using a procedure as follows:

White Swiss mice (11–13 g.) were divided into groups of four mice each. Each group was given an intraperitoneal injection of drug in differing concentrations, including a control group treated only with carriers. One hour after injection of the drug, all mice were bled from the orbital sinuses. Repeat bleedings from mice surviving acute toxicity were made at six hours post-injection. Serums were separated from collected blood by spinning at 11,000 rpm in a microhematocrit centrifuge.

Cells susceptible to poliovirus III ($BSC_1$) were grown to confluency on assay plates and were then infected with poliovirus III. After a period of adsorption the plates were overlayed with agar. One-fourth-inch fiber pads were impregnated with 20 µl. of mouse serum. The pads were positioned on the surface of the agar-overlayed infected plate. The plates were incubated for 72 hours at 37°C. and then were fixed with 10% formalin—2% sodium acetate for 1 hour, after which the agar was floated off in flowing tap water. The plates were then stained with tetrachrome stain (MacNeal). If biologically active levels of compounds are present, a zone of viral inhibition occurs at the positions of the pads containing serum from treated animals. No zones appear at the positions of pads containing serum from untreated animals.

The results of this test are summarized in Table IV (Z indicates zone diameter in millimeters; M indicates grading of stained areas as defined hereinabove):

TABLE IV

Antiviral Activity of Factor A in Mouse Serum

| Dosage mg./kg. | One Hour | | | Six Hours | | |
|---|---|---|---|---|---|---|
| | Survivors | Z | M | Survivors | Z | M |
| 234 | 4 | 30 | 4+ | 0 | | |
| 117 | 4 | 29 | 4+ | 0 | | |
| 58 | 4 | 24 | 4+ | 4 | 23 | 4+ |
| 29 | 4 | 20 | 4+ | 4 | 18 | 4+ |

In some instances mixture of the A-26771 antibiotics can be employed without the necessity of separating and using the individual factors. For example, in fighting fungal growth on environmental surfaces such as shower stalls, walls, floors, tables and the like, a mixture of the antibiotics is suitable. When used in combatting infections in an infected host however, it is desirable to employ a single factor, for example factor B, for administration.

As antibacterials and antifungals, the A-26771 antibiotics are useful for incorporation into topical preparations. Such preparations are adapted for administration to subjects exposed to, or infected with, sensitive bacteria or fungi. Suitable preparations include, for example, ointments, creams, emulsions, salves, emollients and sprays. Although the optimal concentrations will differ dependent upon variables such as the infecting bacteria or fungi, the factor or mixture of factors employed, and the like, the A-26771 antibiotics are typically effective in topical preparations in concentrations of from about 0.05 to about 2.0 percent by weight.

In addition, effective amounts of the A-26771 antibiotics may be incorporated into various pharmaceutical formulations, such as suspensions, emulsions, powders, dusts, soaps, detergents, aerosols and the like, for purposes of cleaning, disinfecting, or sterilizing. Thus, for example, the A-26771 antibiotics may be used to disinfect surfaces such as animal-body surfaces, dental and surgical instruments, glassware walls, floors, tables and the like. For purposes such as cleaning, disinfecting or sterilizing, the A-26771 antibiotics are effective in concentrations as low as 0.1 percent by weight.

Furthermore, antibiotic A-26771 factors A and C are also antiviral agents. Thus, solutions containing either of these factors, preferably together with a surfactant, can be used to decontaminate the in vitro habitat on which viruses, such as polio or Coxsackie, are present. Solutions containing factors A or C are effective in the control of viruses when concentrations of factors A or C ranging from about 1 to about 1500 µg./ml. or more are used.

In another aspect of the invention, the A-26771 factors A and C can be administered parenterally to mammals for the control of viruses. Useful dosage levels for prevention or treatment of viral diseases vary from about 5 to about 60 mg./kg. of mammalian body weight, depending upon whether the drug is to be used prophylactically or therapeutically.

The newly-found and hitherto undescribed organism strain which produces the A-26771 antibiotics was isolated by standard serial-dilution procedure from a soil sample collected from Mt. Ararat in Eastern Turkey. The organism has been taxonomically characterized as a new strain of *Penicillium turbatum* Westling which is in the *Penicillium thomii* series, Section Monoverticillata.

A culture of the A-26771-producing organism has been deposited with the permanent culture collection of the Agricultural Research Service, Northern Utilization Research and Development division, U.S. Department of Agriculture, Peoria, Ill. 61604, where it has been deposited without restriction as to availability and has been accorded the accession number NRRL 5630.

The characteristics of *Penicillium turbatum* NRRL 5630 are given in the following paragraphs.

Color names were assigned according to the ISCC-NBS method described by Kelly et al. in "The ISCC-NBS Method of Designating Colors and a Dictionary of Color Names," National Bureau of Standards Circular 553, Washington, D.C., U.S. Government Printing Office. Color shades (M&P) are designated using "A Dictionary of Color" by A. Maerz and M. Rea Paul, McGraw-Hill, New York, N.Y.

CULTURAL CHARACTERISTICS

Potato-Dextrose Agar.

Colonies are velutinous. A slightly crenated, nearly white marginal area borders colonies which are light grayish olive (ISCC-NBS 109), quaker gray -(M&P 21-B-1). The reverse color is oyster gray (M&P 19-A-1), pale yellow green (ISCC-NBS 121). The colonies achieve 40 mm. in seven days with little further growth when incubated at 26°–28°C. Sclerotia are formed in 7 days and are at first hyaline, then yellow-brown, globose to subglobose, comparatively soft; and when crushed, their outer wall appears constructed of pseudoparenchymatous cells. They measure 94–320 μ and average 219 μ.

Malt-Extract Agar

Colonies up to 40 mm. in diameter are produced in seven days. Early sporulation occurs in 4 days and becomes relatively heavy in 5 days; however, relatively few penicilli are formed. The colony surface is smooth, a gray-green shade with a 5-mm. periphery of white—mermaid (M&P 21-B-6) which is grayish yellow-green (ISCC-NBS 122). The reverse color is oyster white (M&P 10-A-1), pale yellow-green (ISCC-NBS 121).

No sclerotia are observed at 2 weeks. After 3 weeks some scattered sclerotia appear which are similar to those described on potato-dextrose agar. They measure 85–240 μ and average 190 μ. Conidia are spherical to subglobose, smooth, dry, hyaline microscopically, greenish en masse, in basipetal chains and range from 3.0–5.0 μ, averaging 3.4 μ. Sterigmata are generally observed in groups of 3, occasionally 5. They are slightly tapered near their apex and are smooth-walled. They are not supported by verticils of metulae or branches but occur as terminal adornment on conidiophores. Occasional aberrant forms are elaborated, such as a second penicillus formed terminally on the central sterigma of the verticil which is associated with the conidiophore. Single terminal or lateral phialides are rarely formed. Sterigmata range from 7–15 μ long and 1.4 to 3.0 μ wide, averaging 13 82 to X to 2.8 μ. Some branches are strongly divaricate from the main conidiophore and are, therefore, considered monoverticillate. Branches are up to 60 μ long. Main conidiophores are 2–4 μ and 65–108 μ long.

Czapek's-Solution Agar.

Colonies achieve 35 mm. in diameter in seven days with no further change in size. The colony is strongly wrinkled with deep furrows which radiate from a highly wrinkled center. It appears to be a thin velvety felt that is not so heavily sporulated as when grown on malt-extract agar or potato-dextrose agar. After seven days the colony surface is ivory white (M&P 10-B-2) or pale yellow (ISCC-NBS 89). After 12 days the surface becomes oyster white (M&P 10-B-1) or pale yellow-green (ISCC-NBS 121). The reverse surface is white jade (M&P 10-A-2), pale yellowish-pink (ISCC-NBS 31). There is neither describable odor nor exudate. Sclerotia are not present in 2 weeks. A very few sclerotia appear in 3 weeks. These sclerotia appear to cause a reddish-brown color in their immediate vicinity. They range in size from 175–406 μ and average 349 μ.

MORPHOLOGICAL CHARACTERISTICS

This culture produces single verticils of sterigmata at the tips of conidiophores which arise from the agar or from rambling hyphae. Some branches occur which appear as individual conidiophores terminating with verticils of sterigmata. These sterigmata (3–5) give rise to chains of conidia. Each branch appears to be monoverticillate. No branching occurs at the apex of the main axis.

A relationship is seen with the biverticillate Asymetrica-Divaricata, specifically *Penicillium pulvillorum* in the *P. raistrickii* series. However, *P. pulvillorum* produces rough-walled conidiophores and sterigmata as well as definite metulae, also rough-walled; *P. turbatum* has smooth-walled conidiophores and sterigmata with no definite metulae. Furthermore, *P. pulvillorum* colonies grown on malt-extract agar are reddish shades on the reverse side. The fact that *P. pulvillorum* produces abundant sclerotium on Czapek's-solution agar does not conform with the literature description of *Penicillium turbatum*.

Based on the foregoing taxonomic description of the A-26771-producing strain, the organism has been classified as a novel strain of *Penicillium turbatum* Westling. The A-26771-producing organism differs slightly from *Penicillium turbatum* Westling as described by Raper and Thom in the "Manual of the Penicillia." The greatest difference occurs in sclerotia production, which in the published description is reported as heavy on malt-extract agar and non-existent on Czapek's-solution agar. Sterigmata of the A-26771-producing strain are a little larger than those described by Raper and Thom. These differences, however, are merely strain differences; in all other respects the characteristics are in agreement with the published description of that species.

The culture medium employed to produce the antibiotic mixture can be any one of a number of media since the A-26771-producing organism is capable of utilizing energy from a variety of nutrient sources. Thus, for example, a variety of carbohydrates can be included in the culture medium to supply the carbon requirements for the organism. Likewise, various sources of nitrogen, such as distillers' extracts, amino acids, and like nitrogen sources can be employed in the A-26771 medium. For reasons of economy in production, optimal yield, and ease of isolation of the antibiotic, certain culture media are preferred. The preferred sources of carbohydrate in the fermentation, for example, are glucose and sucrose, although other sugars can also be used. Preferred sources of nitrogen are peptones, but soybean meal, amino acid mixtures, and the like are also useful. As is common in the production of antibiotics in general, nutrient inorganic salts can be incorporated in the culture medium for the production of A-26771 antibiotics. Such inorganic nutrients are the customary salts capable of yielding sodium, potassium, ammonium, calcium, phosphate, chloride, carbonate, sulfate and like ions.

Minor elements necessary for optimum growth and development of the A-26771-producing organism can also be included in the culture medium. Such trace elements commonly occur as impurities in the other constituents of the medium in amounts sufficient to meet the growth requirements of the A-26771-producing organism.

The strain of the organism employed to produce the A-26771 antibiotics is capable of growing under a variety of conditions. The organism will grow, for example, in a variety of media in which the initial pH varies rather extensively. It has been found desirable, however, to initiate the fermentation in a medium at a pH between about 6 and about 8 and preferably between about 6.5 and 7.0. Commonly, during the growth of the organism, the pH of the medium will decrease gradually from the initial levels to a pH of about 4 or lower. The final pH of the culture medium is dependent, at least in part, on factors such as the initial pH of the medium, the buffer present therein, and the length of time the orgnism is allowed to grow.

The A-26771-producing organism of the present invention is capable of growing and producing antibiotic activity on various types of media. The organism can be grown, for example, on agar slants, in shake flasks, or in medium- or large-scale fermentation tanks. For large-scale production of the antibiotics of the present invention, submerged aerobic fermentation conditions are preferable. For the preparation of relatively small quantities of the A-26771 antibiotics, shake-flask or surface culture in bottles can be employed.

In carrying out the submerged aerobic fermentation for production of the A-26771 antibiotics, the organism is first grown on agar-slant cultures; and the spores of the fungus are transferred from the slant to a vegetative medium. The vegetative medium thus inoculated with spores from the agar slant insures a rapid growth of the organism on a small scale. The inoculated vegetative medium is allowed to grow until a viable culture of the growing organism is obtained; it is then used to inoculate the larger-scale tank. Fermentation media in large-scale tanks, thus inoculated by means of a vegetative medium, provide more rapid growth of the organism than that obtained by direct inoculation with spores from an agar slant. Such rapid growth obtained with a vegetative inoculum is highly desirable from the production standpoint in that fermentation time and overall production time are reduced.

The strain of the organism producing the A-26771 antibiotics grows best at temperatures between about 20 and 30°C. Optimal production of the antibiotic appears to occur at temperatures between about 24° and about 28°C.

As in other aerobic, submerged culture processes, sterile air is blown through the culture medium during the fermentation period. For efficient growth of the organism and consequent efficient production of the antibiotic, the volume of air employed is preferably in excess of about 0.1 volume of air per volume of culture medium per minute. In the submerged aerobic fermentation of the A-26771 antibiotics, optimal yields are obtained when the volume of air employed is at least 0.3 volumes of air per volume of culture medium per minute.

In genral, maximum production of the A-26771 antibiotics occurs between about 3 and about 10 days after the inoculation of the culture medium when submerged aerobic fermentation conditions or shake-flask culture conditions are employed. The maximum production of the antibiotics in large-scale fermentation tanks under submerged aerobic conditions is reached in about 8 days.

The course of the fermentation can be followed by assaying the fermentation medium from time to time against an organism susceptible to the A-26771 antibiotics. Three such organisms which can be employed are *Sarcina lutea*, *Staphylococcus aureus*, and *Bacillus subtilis*.

Following the production of the antibiotics under submerged aerobic fermentation conditions, the A-26771 antibiotic mixture previously described can be recovered from the fermentation medium by methods commonly employed in the fermentation art. The majority of factor B produced is found associated with the mycelium. The majority of factors A and C produced is found in the filtered broth.

Under the conditions employed thus far, the strain of the organism described previously and designated as NRRL 5630 produces antibiotic factor B as the predominant antibiotic factor. In general, factor B accounts for between about 85 and 95% of the total recovered antibiotic activity. The remaining factors account for substantially the remainder of the antibiotic activity.

The A-26771 antibiotics are recovered from the fermentaion medium as antibiotic mixtures. Since the majority of the antibiotic activity is associated with the mycelia, the fermentation medium if filtered; and the mycelia are extracted with a suitable organic solvent. To obtain factors A and C, which are present in greatest quantity in the broth, the filtered broth is also extracted with a suitable organic solvent.

Solvents which are esters, such as ethyl acetate, amyl acetate and isoamyl acetate are suitable solvents useful for extracting either the mycelia or the filtered broth. Ethyl acetate is a particularly desirable extractant. The extracts are then dried and evaporated to dryness to afford the crude antibiotic mixtures.

Alternatively, the whole fermentation broth can be extracted with a suitable organic water-immiscible solvent, such as ethyl acetate, and thereafter filtered. The extract is treated as in the first instance to obtain the crude antibiotic mixture.

The crude mixtures of A-26771 antibiotics are purified by methods such as fractional crystallization of the mycelial extract or chromatography of the broth extract over a suitable adsorbent such as silica gel or alumina.

In a preferred recovery procedure, the mycelia and broth are separated by filtration. Subsequently, the separated mycelia are extracted with a suitable organic solvent such as ethyl acetate or amyl acetate; and the extract is dried and concentrated to afford a crude antibiotic mixture which contains factor B as a major component. In addition, the filtered broth is also extracted with a suitable organic solvent such as ethyl acetate; this extract is dried and evaporated under vacuum to give an antibiotic mixture which contains larger quantities of factors A and C.

The individual antibiotic factors can be separated from each other and isolated as individual antibiotics by techniques known in the art. The crude mixtures, for example, can be separated by chromatography over silica or alumina. Alternatively, individual antibiotics can be obtained by fractional crystallization.

Because the majority of the most abundant factor, factor B, is present in the mycelia, it is possible to separate and isolate this factor by crystallization techniques alone. Thus, factor B is obtained in crystalline form by concentrating the dried ethyl acetate extract of the mycelia to a small volume from which a large portion of factor B precipitates. Cooling the concentrated solution facilitates crystallization. The precipitate is filtered and purified further by recrystallization.

The other described factors which occur individually as minor antibiotic factors are more difficult to separate from one another. In order to obtain factors A and C, a combination of chromatographic separations and crystallization techniques is required. Accordingly, the dried ethyl acetate extract from the broth is concentrated to an oil which is then chromatographed, preferably over silica gel, employing solvent mixtures such as ethyl acetatemethanol to effect a partial separation of the remaining factors. Further purification is achieved by subsequent chromatographic separations of the eluate fractions from the silica gel chromatogram and by fractional crystallizations to provide factors A and C.

The following examples are provided in order to more fully illustrate the methods and procedures of the present invention.

EXAMPLE 1

Production of the Antibiotic A-26771 Mixture

Spores of *Penicillium turbatum* strain NRRL 5630 were inoculated on a nutrient agar slant having the following composition:

| Ingredient | Weight/Volume (g./l.) |
| --- | --- |
| Glucose | 20. |
| Peptone | 5. |
| Potassium dihydrogen phosphate | 0.5 |
| Magnesium sulfate | 0.02 |
| Ferrous sulfate | 0.01 |
| Agar | 20. |
| Deionized water | q.s. 1 liter |

The inoculated agar slant was incubated for 7 days at a temperature of 25°C. and refrigerated until used. The agar slant was then covered with beef serum and was gently scraped with a sterile needle to suspend the spores and cells in the serum. The resulting suspension was divided into six tubes for lyophilization. One of the lyophilized pellets thus prepared was used to inoculate 100 ml. of a vegetative medium having the following composition:

| Ingredient | Weight/Volume (g./l.) |
| --- | --- |
| Sucrose | 25. |
| Edible molasses | 36. |
| Corn Steep | 6. |
| Potassium dihydrogen phosphate | 2. |
| Enzyme-hydrolyzed casein[1] | 10. |
| Tap water | q.s. 1 liter |

[1]"NZ Case," Sheffield Chemical Co., Norwich, N.Y.

This vegetative inoculum, in a 500-ml. flask, was shaken on a rotary shaker at 250 rpm for 24–48 hours at a temperature of about 25°C.

Following the incubation of the vegetative inoculum, five percent of the volume of the vegetative inoculum containging viable vegetative growth was employed to inoculate the sterile fermentation medium for the production of the A-26771 antibiotics. The production medium has the following composition:

| Ingredient | Percent |
| --- | --- |
| Glucose | 4.0 |
| Molasses | 2.0 |
| Peptone[1] | 1.5 |
| Tap water | q.s. 25 liters |

[1]Wilson's Meat Packing Co., No. 159

The pH of the medium thus prepared was 6.3; it was adjusted to pH 7.0 with sodium hydroxide. The medium was then sterilized by autoclaving at 120°C. for 30 minutes at 15–20 pounds per square inch pressure. After sterilization the pH was approximately 6. The inoculated production medium, contained in a 40-liter fermentor, was allowed to ferment at a temperature of about 25°C. for 6 to 7 days. The fermentation was aerated with sterile air at a rate of one-half volume of air per volume of culture medium per minute.

At intervals during the fermentation, small samples of the production medium were withdrawn and assayed for antibiotic activity against one or more of the following organisms: *Sarcina lutea*, *Staphylococcus aureus*, or *Bacillus subtilis*.

During the course of the fermentation, the pH of the medium gradually decreased to a final value of between pH 3.6–4.2. Antibiotic A-26771 factors A, B, and C are co-produced during the above-described fermentation. Factors A and C are isolated from the filtered broth, and factor B is isolated from the mycelia.

In Example 2 which follows, the separation, purification and isolation of the individual A-26771 antibiotics from the fermentation medium is described. Because of the greater abundance of factor B in the A-26771 mixture, it is the most easily isolated factor of the three thus far identified in the A-26771 mixture.

EXAMPLE 2

Isolation of Factors A, B, and C

Factor B

The fermentation medium (100 liters) was filtered, using a filter aid. The mycelia were extracted with ethyl acetate (40 liters), and the mycelial cake was discarded. The ethyl acetate phase was dried ($Na_2SO_4$) and concentrated under vacuum to a volume of 4 liters. After cooling for 72 hours at 4°C., a semicrystalline mass had precipitated. This precipitate was separated by filtration, and the dark-colored filtrate was discarded. The precipitate (200 g.) was dissolved in ethyl acetate (2 liters) and filtered. The filtrate was chilled at 4°C. for 24 hours to afford 46 g. of crystalline factor B. Three more crystallizations of factor B from the filtrate during the following days, using the procedure described hereinabove, afforded a total of 110 g. of crystalline factor B, melting at 125°C. The properties of the four crystalline crops were identical in all respects.

Factor A

The filtered broth from 100-liters of fermentation medium, obtained as described hereinabove, was extracted with an equal volume of ethyl acetate. The ethyl acetate extract was dried ($Na_2SO_4$) and concentrated to an oil under vacuum. This oil (15.4 g.) was chromatographed over a 5.0 × 62.0 cm. column of silica gel (grade 62; 60–200 mesh; Matheson, Coleman and Bell). The column was eluted at a rate of 3 ml./min. with ethyl acetate-methanol (9:1), 20-ml. fractions being collected.

During both this and subsequent chromatographies, the presence of factor A in column fractions was determined by subjecting the fractions to thin-layer chromatography on silica gel (E. Merck, 20 × 20 cm. pre-coated, F-254, layer thickness 0.25 mm. on glass, Brinkmann Instruments, Inc.), developing in benzene-methanol (95:5) and using *Sarcina lutea* as the bioautograph organism.

The active fractions were combined and concentrated in vacuo to an oily residue (1.8 g.). This residue was rechromatographed on a 4.5 × 39.0 cm. column of silica gel (grade 62, 60–200 mesh), eluting with benzene-methanol (95:5) at a flow-rate of 3 ml./min.

The active fractions from this column were combined and rechromatographed on a 5.0 × 50.0 cm. column of silica gel (grade 62; 60–200 mesh), eluting with chloroform at a flow-rate of 0.5 ml./min. and collecting 5 ml.-fractions. Factor A was eluted in fractions 169–210. The fractions containing factor A were chromatographed a final time on a 2.0 × 110.0 cm. column of silica gel (grade 62, 60–200 mesh), eluting with a chloroform-methanol (98.5:1.5) solvent mixture. The active fractions from this chromatography were combined and yielded factor A (90 mg.) as yellow, prismatic crystals from acetone-diethyl ether-pentane melting at 105°C.

Factor C

During the chromatographic separations described hereinabove for factor A, the presence of another biologically active compound was observed. The fractions containing this compound were combined and concentrated under vacuum to an oil. This oil was rechromatographed on a 2.0 × 100.0 cm. column of silica gel (grade 62), eluting with an ethyl acetate-hexane (1:2) solvent system at a flow-rate of 2 ml./min. The fractions containing the new active material were combined and concentrated under vacuum to an oil which crystallized from acetone-diethyl ether-pentane to give 12 mg. of factor C, melting at about 130°C.

The presence of factor C in column fractions was determined by the thin-layer chromatographic method described hereinabove for factor A. In addition, the antibiotic A-26771 factors can be characterized by thin-layer chromatography on silica gel (E. Merck, 20 × 20 cm., precoated, F-254, layer thickness 0.25 mm. on glass, Brinkmann Instruments, Inc.) in a chloroform-methanol (98:2) solvent system with Rf values as follows(detection using either ultraviolet absorption or silver nitrate spray reagent number 224 as described in "Thin-Layer Chromatography," 2nd ed., E. Stahl, Ed., Springer-Verlag, New York, N.Y., 1969, p. 897):

| Factor | Rf Values relative |
|--------|--------------------|
| A | 0.48 |
| B | 0.05 |
| C | 0.37 |

EXAMPLE 3

Preparation of Factor B Methyl Ester

The methyl ester of A-26771 factor B has been prepared by methylation with either a) 3% methanolic HCl or b) trimethyloxonium fluoborate in methylene chloride, using standard procedures. The methyl ester crystallizes from methanol, melting point 90°–91°C. The infrared absorption spectrum of the methyl ester (KBr) shows carbonyl bands at 1745 (shoulder), 1735, 1718 and 1702 cm$^{-1}$. The mass spectrum shows molecular ion at 396.21409, corroborating the 396.21480 theoretical mass for $C_{21}H_{32}O_7$.

We claim:

1. The method for producing antibiotic A-26771 factors A, B, and C which comprises cultivating *Penicillium turbatum* NRRL 5630 in a culture medium containing assimilable sources of carbohydrate, nitrogen, and inorganic salts until a substantial amount of antibiotic activity is produced by said organism in said culture medium, and separating the A-26771 antibiotic mixtures from said culture medium.

2. The method of claim 1 which includes the additional step of isolating A-26771 factor A from said A-26771 antibiotic mixtures.

3. The method of claim 1 which includes the additional step of isolating A-26771 factor B from said A-26771 antibiotic mixtures.

4. The method of claim 1 which includes the additional step of isolating A-26771 factor C from said A-26771 antibiotic mixtures.

* * * * *